United States Patent [19]

Peek

[11] Patent Number: 4,592,592
[45] Date of Patent: Jun. 3, 1986

[54] SAFETY DEVICE FOR BICYCLE CARRIER FOR CHILDREN

[76] Inventor: Jean M. Peek, 1639-D Spartan Village, East Lansing, Mich. 48823

[21] Appl. No.: 660,729

[22] Filed: Oct. 15, 1984

[51] Int. Cl.⁴ .............................................. A47D 1/10
[52] U.S. Cl. ..................................... 297/483; 297/284
[58] Field of Search ........................ 297/243, 483, 484

[56] References Cited

U.S. PATENT DOCUMENTS

| | | |
|---|---|---|
| 1,616,349 | 2/1927 | Cagle . |
| 2,652,183 | 6/1950 | Hlivaka . |
| 3,099,486 | 11/1959 | Scott . |
| 3,136,581 | 7/1962 | Caballero . |
| 3,380,776 | 6/1966 | Dillender . |
| 3,454,304 | 7/1969 | Hudak ................................. 297/484 |
| 3,604,750 | 11/1968 | Doering . |
| 3,713,692 | 1/1973 | McCracken et al. . |
| 3,746,392 | 7/1973 | German . |
| 3,779,599 | 12/1973 | Gottfried ......................... 297/484 X |
| 3,802,598 | 4/1974 | Burger et al. . |
| 3,834,758 | 9/1974 | Soule ................................. 297/484 |
| 3,902,737 | 9/1975 | Berger et al. . |
| 3,910,634 | 10/1975 | Morris ............................. 297/484 X |
| 3,918,760 | 11/1975 | Goldberg ......................... 297/484 X |
| 4,022,488 | 5/1977 | Likas . |
| 4,026,448 | 5/1977 | Lewis ............................... 297/243 X |
| 4,050,737 | 8/1976 | Jordan . |
| 4,051,985 | 4/1977 | Berger . |
| 4,053,091 | 10/1977 | Martelet . |
| 4,085,968 | 4/1978 | Svenson et al. . |
| 4,235,474 | 11/1980 | Rosenberg . |
| 4,330,152 | 5/1982 | Legan et al. . |
| 4,367,829 | 1/1983 | Kusz . |
| 4,376,551 | 3/1983 | Cone ................................. 297/484 X |
| 4,436,341 | 3/1984 | Converse . |
| 4,440,331 | 4/1984 | Schimmels . |

FOREIGN PATENT DOCUMENTS

| | | |
|---|---|---|
| 2108718 | 8/1972 | Fed. Rep. of Germany ...... 297/484 |
| 1359229 | 3/1963 | France ............................... 297/484 |
| 1056714 | 1/1967 | United Kingdom ................ 297/484 |

Primary Examiner—William E. Lyddane
Assistant Examiner—Peter A. Aschenbrenner
Attorney, Agent, or Firm—Ian C. McLeod

[57] ABSTRACT

A safety device adapted for a bicycle carrier (100) for carrying a child is described. The device includes a single harness (30) which is supported by separate frames (104, 105) under a seat member (100) of the carrier and by parallel portions across the chest of the child so as to prevent forward or sideways or lateral movement of the child. The device aids the bicycle rider in preventing tipping caused by sideways movement of the child when turning.

11 Claims, 7 Drawing Figures

SAFETY DEVICE FOR BICYCLE CARRIER FOR CHILDREN

BACKGROUND OF THE INVENTION (1) Field of the Invention

The present invention relates to a safety device for a bicycle carrier for children which aids in preventing tipping of the bicycle while it is in motion. In particular the present invention relates to a safety device having a harness which uniquely engages a seat member and a frame supporting the seat member mounted on the bicycle so as to restrain upper body movement of the child.

(2) Prior Art

The prior art has described a number of restraint devices for chairs, wheelchairs and the like. Illustrative are: U.S. Pat. Nos. 2,652,183 to Hlivka; 3,099,486 to Scott; 3,136,581 to Caballero; 3,604,750 to Doering; 3,713,692 to McCracken et al; 4,050,737 to Jordan; 4,235,474 to Rosenberg and 4,330,152 to Legan et al. None of these devices will prevent sideways movement of the upper body of the person in the chair and in fact there would be no reason to do so since limited sideways movement is desirable in most instances for persons confined in a chair.

The prior art has described many seat belt devices for relatively fast moving wheeled vehicles, such as for infant car seats and for bicycle carriers. Illustrative of various bicycle carriers for children are U.S. Pat. Nos. 3,746,392 to German; 3,802,598 to Burger et al; 3,902,737 to Berger et al; 4,022,488 to Likas; 4,051,985 to Berger; 4,053,091 to Martelet; 4,085,968 to Svensson et al; 4,367,829 to Kusz and 4,440,331 to Schimmels. There is no attempt in the devices of these patents to restrain the upper body movement of a child seated in the carrier.

U.S. Pat. Nos. 1,616,349 to Cagle; 3,380,776 to Dillender and 4,436,341 to Converse show various restraint devices for use in automobiles which is a much different setting than a two wheeled bicycle. In an automobile sideways upper body movement has no visible affect on the vehicle and is usually regarded as being desirable.

The problem in riding a bicycle, especially a two wheeled bicycle, with a child as a passenger is that child carriers are mounted above the center of gravity of the bicycle and usually behind the seat of the person peddling the bicycle. When a child weighing between about 20 to 40 pounds for instance is seated in the carrier and the upper body is allowed to move sideways, the result is that the child can tip over the bicycle, particularly in a turn. When the bicycle turns a corner the centrifugal force on the child and movement of the upper body sideways urges the bicycle away from the turn tending to tip the bicycle. Finally, the forward movement of the upper body of a child when the bicycle stops even with a lap belt causes the person operating the bicycle to reach back with a hand to keep the upper body of the child from moving forward. If the child's upper body moves forward, the person operating the bicycle can receive a jolt in the back which can also cause injury to the head or neck of the child. All of these problems make bicycle riding hazardous for the children and for the person propelling the bicycle.

OBJECTS

It is therefore an object of the present invention to provide a safety device adapted for mounting on a bicycle carrier for children which prevents forward or sideways upper body movement in the bicycle carrier and thus solves the problem, caused by the upper body movement tending to tip the bicycle or injure the child. Further it is an object to provide a safety device which is simple and economical to construct and which is adapted to mounting on existing bicycle carriers for children. These and other objects will become increasingly apparent by reference to the following description and the drawings.

IN THE DRAWINGS

GENERAL DESCRIPTION

Figure 1:
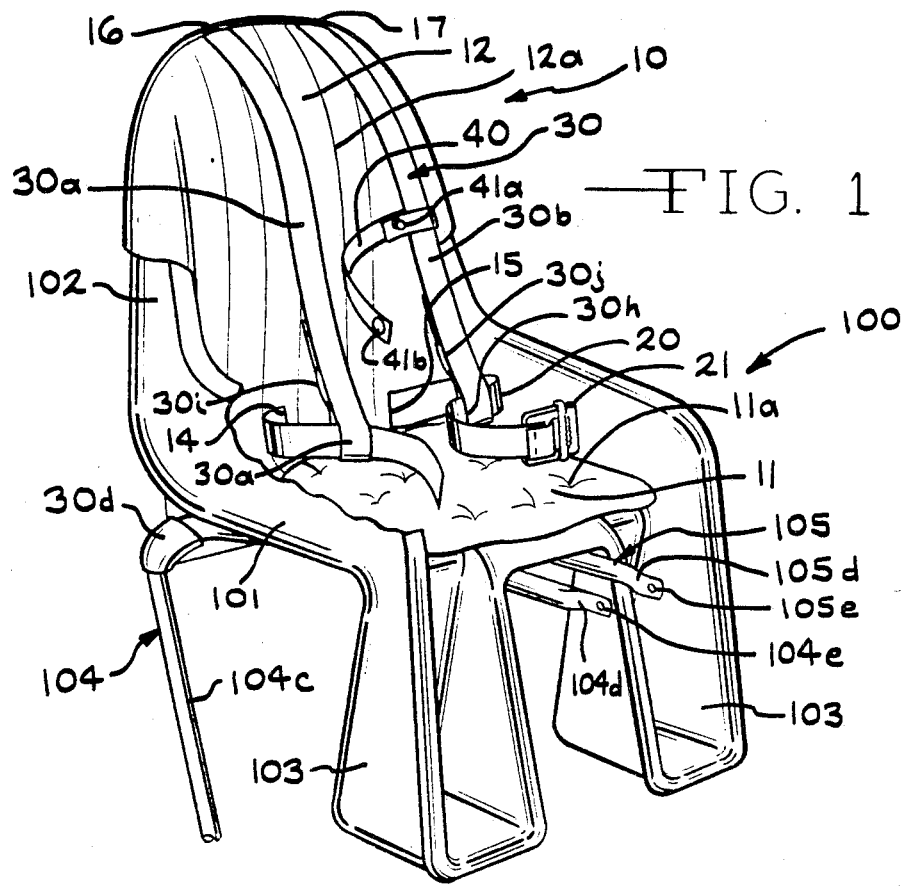
FIG. 1 is a front isometric view of the safety device (10) of the present invention mounted on a conventional bicycle carrier (100), for a two wheeled bicycle and particularly illustrating the harness (30) of and belt (20) joined together for restraining upper body movement of the child.

The present invention relates to a safety device (10) for mounting on a bicycle carrier (100) for carrying a seated child, the carrier having a seat member including a seat bottom (101) and a back support portion (102) extending upwardly to a top adjacent to the shoulders of the child, and the carrier having a pair of frames (104, 105) under the seat portion which are essentially horizontal under the carrier and extend behind the seat portion and adjacent to the back support portion with means for attachment of the frames to the bicycle to support the seat member and including a waist belt (20) which extends through two slots (106, 107) in the back support portion of the seat member with a buckle (21) between two sides of the belt across the lap of the child, the belt having a length sufficient to encircle the waist of a child which devices comprises:

a shoulder harness (30) as a single piece having two ends which is attached to the belt at one end on one side of the buckle, extends upwardly vertically (30a) to the shoulder of the child, over the top of the back portion (102), crosses diagonally the back support portion and then around one frame (105) and around the other frame (104), crosses the back support (102) again and then extends vertically (30b) across the chest of the child to attach to the belt at the other end of the harness on an opposite side of the buckle wherein the safety device restrains movement of upper body of the child when the bicycle turns a corner or stops. Preferably a restraining strap (40) is provided with attachment means (41a, 41b) connecting the vertical portions of the harness across the chest of the child. An important feature of the present invention is that the belt be wound around the frames in a manner such that the belt does not slip when the child moves sideways.

In particular, the present invention relates to a safety device (10) for mounting on a bicycle carrier for carrying a seated child the carrier (110) having a one piece seat member including a seat bottom (101) and a general U-shaped back support portion (102) extending upwardly to a top adjacent to the shoulders of the child from three sides of said seat bottom so as to enclose the lower torso of the seated child, the seat member having lower supports attached to the seat bottom partially enclosing the legs and feet of the seated child and the carrier having a pair of frames (104, 105) under the seat portion which are horizontal under the carrier and extend behind and adjacent to the back support portion the seat portion and having a bend (104b, 105b) with an inside and an outside and with means for attachment of the frames to the bicycle for support of the seat member and including a waist belt (20) which extends through two first slots (16, 17) in the back pad with a buckle (21) between two sides and the belt across the lap of the child the belt having a length sufficient to encircle the waist of a child, the belt being adapted to fit through corresponding second slots (106, 107) in the back support portion of the carrier which device comprises:

a seat pad (11) which covers the seat bottom of the carrier;

a back pad (12) attached and extending from the seat pad which covers the back portion of the carrier;

a cap (13) portion attached to the back pad which fits over the top of the support portion to hold the back and seat pads in place on the carrier;

a shoulder harness (30) as a single piece having two ends which is attached to the belt at one end on one side of the buckle, extends upward vertically (30a) to the shoulder of the child passes through one of a pair of third slots (16) at the top of the cap, crosses diagonally around a first of the bends (105b) in the one frame (105), crosses around a second of the bends (104b) in the other frame (104) passes through the other of the third slots (17) in the cap, extends vertically (30b) over the shoulder of the child to attach to the belt at the other end of the harness on an opposite side of the buckle; and a restraining strap (40) with attachment means (41a, 41b) connecting the vertical portions of the harness across the chest of the child, wherein the safety device restrains movement of the body of the child when the bicycle turns a corner or stops.

SPECIFIC DESCRIPTION

FIGS. 1 to 7 show the safety device 10 of the present invention either mounted on a conventional child carrier 100 as well as separated from the carrier 100. The carrier 100 includes a seat bottom portion 101, a back support portion 102 and lower support portion 103 which is adapted to support and partially enclose the feet of a child. The portions 101, 102 and 103 are usually integrally joined together and molded as a unit. The seat bottom 101 is supported on its underside on integral posts 101a by frames 104 and 105 which have horizontal sections 104a and 105a under the seat bottom, each having bends 104b, 105b behind the seat bottom portion 101 and adjacent to the back support portion 102 and then have downward extending extensions 104c and 105c to the bicycle frame (not shown) to attach in a conventional manner as shown for instance by U.S. Pat. Nos. 3,802,598; 4,022,488; 4,051,985; 4,053,091, or 4,085,968. The frames 104 and 105 attach at outward extensions 104d and 105d usually adjacent to the rear of the bicycle seat (not shown) by means of holes 104e and 105e. All of this is well known to those skilled in the art.

The carrier 100 merely provides the setting for the safety device 10 of the present invention.

Figure 2:
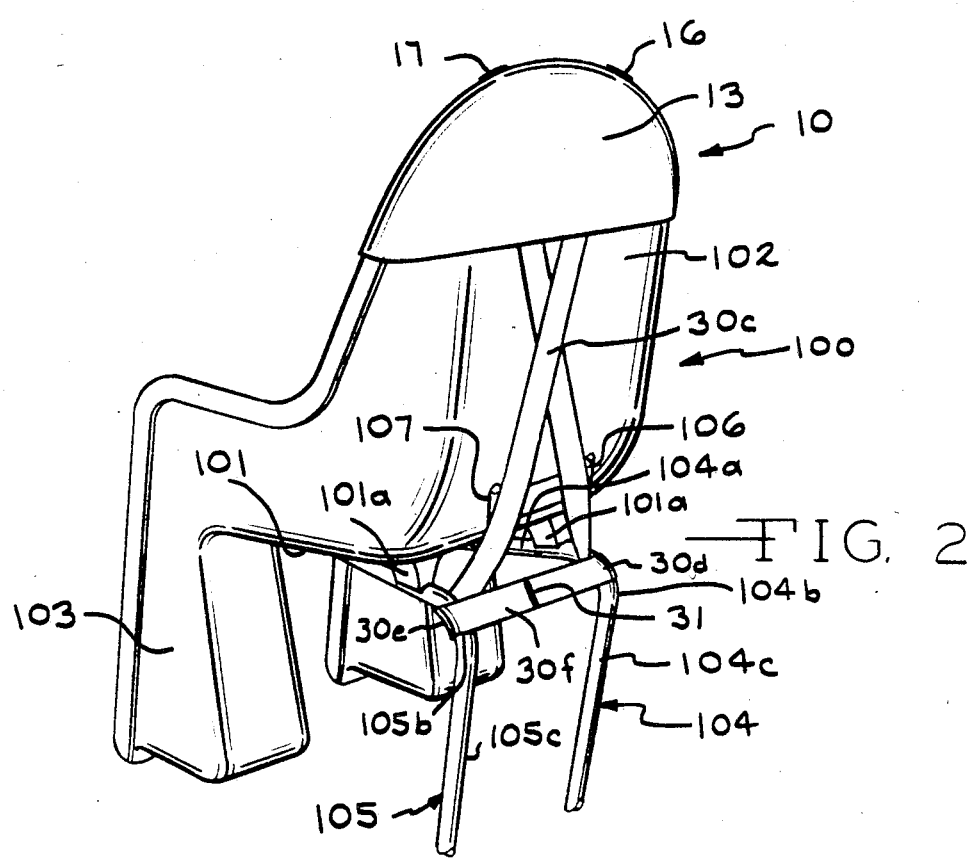
FIG. 2 is a rear isometric view of the safety device (10) as shown in FIG. 1.
Figure 3:
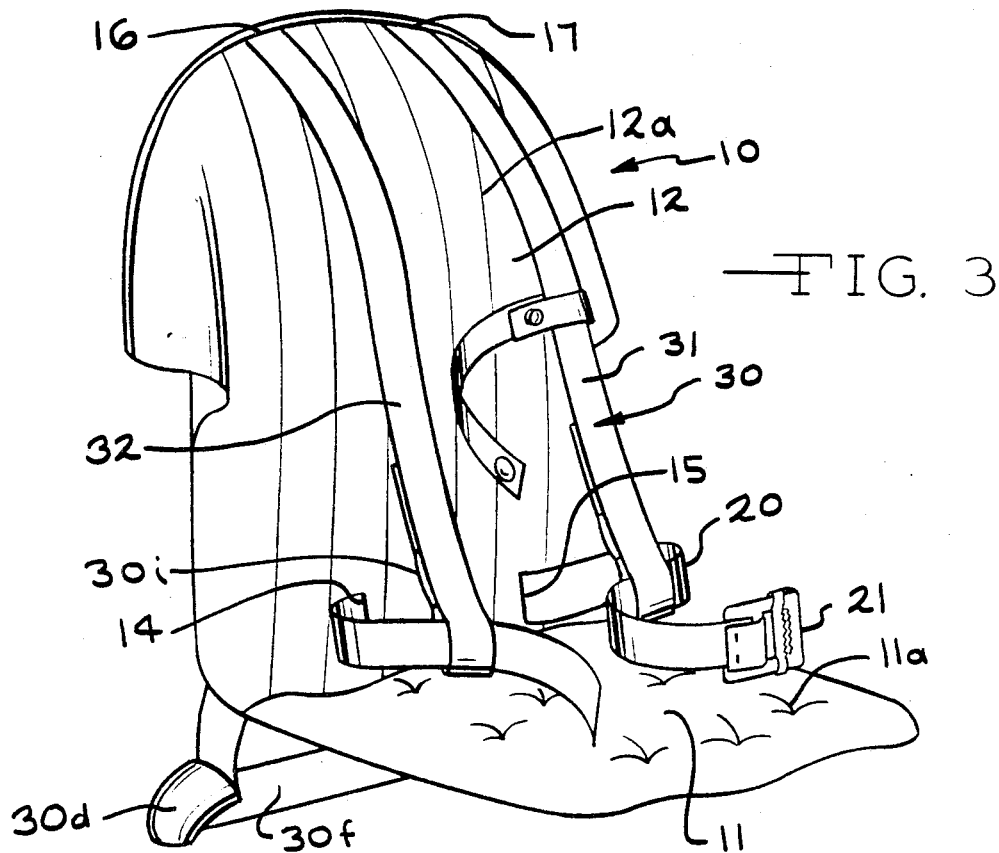
FIG. 3 is a front isometric view of the safety device (10) of the present invention as shown in FIGS. 1 and 2 separated from the bicycle carrier (100), particularly illustrating a seat pad (11) and a back pad (12) with the harness (30) and lap belt (20).
Figure 4:
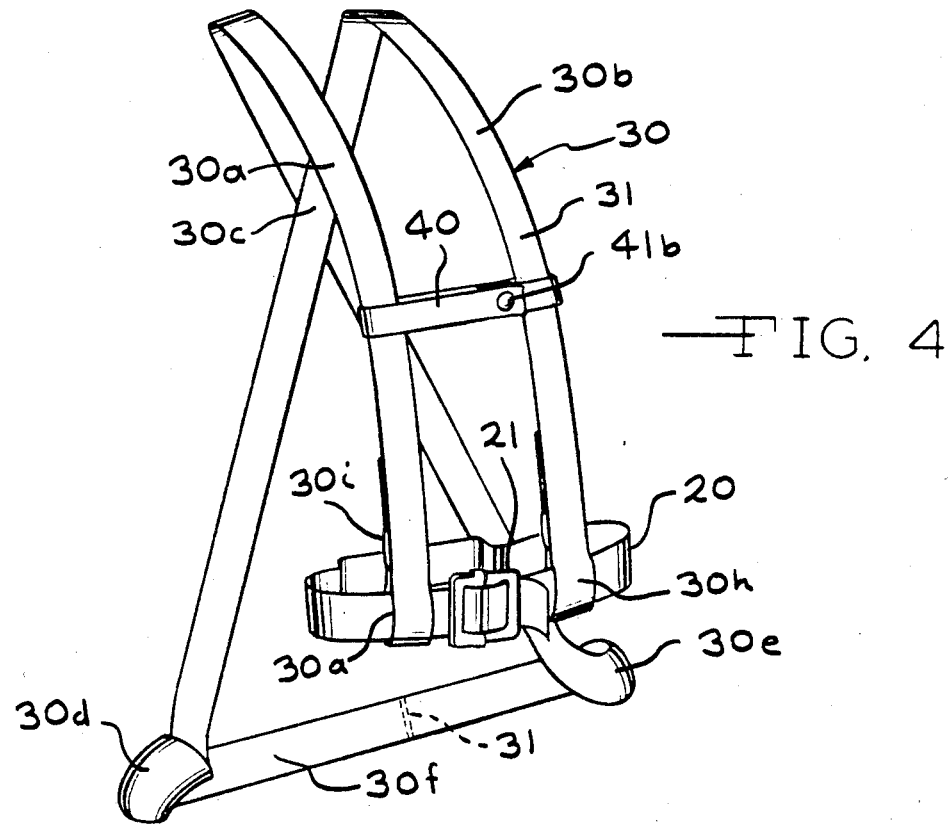
FIG. 4 is a front isometric view of the harness (30) and lap belt (20) alone.

FIGS. 1 and 2 show the safety device 10 mounted on the carrier 100 and FIG. 3 shows the device 10 detached from the carrier 100. FIG. 4 shows only the waist belt 20 and the shoulder harness 30 which is the essential feature of the present invention. A seat pad 11 covers the seat bottom portion 101 of the carrier 100. Attached to and extending from the seat pad 11 is a back pad 12 which covers most of the back portion 102 of the carrier 100. The back pad 12 can have pleats 12a as shown and the seat pad 11 can have tucks 11a, as is conventional where a fabric such as cloth, plastic or leather is used, in order to hold conventional padding (not shown) in place inside the pads 11 and 12. The back pad 12 is provided with a cap 13 which extends over the top of the back portion 102 which serves to hold the back 12 and seat pad 11 in position on the carrier 100.

A waist belt 20 extends through vertically oriented slots 14 and 15 in the back pad 12 adjacent to the seat portion 11 and through corresponding slots 106 and 107 in the back support portion 102 of the carrier 100. The belt 20 includes a buckle 21 or other attachment means for fastening the belt 20 around the waist of a child. Generally the belt 20 comes with the carrier 100 and the use of lap belts 20 is known to those in the art.

The feature of the present invention which is especially unique is the specially constructed shoulder harness 30. The harness 30 includes a single piece of material which interconnects with the frames 104 and 105 so as to prevent forward or sideways movement of a child when the harness 30 is in position. As can be seen from FIG. 4, the harness 30 includes two upwardly extending parallel chest engaging portions 30a and 30b which extend around the shoulder of the child and through slots 16 and 17 at the top of back pad 12 and then cross over each other at intersection 30c and have loops 30d and 30e around the bends 104b and 105b of the frames 104 and 105 and come together at horizontal portion 30f between the frames 104 and 105. A mark or other indicia 31 is provided on the harness 30 in order to insure proper positioning of the harness 30. The strap 30 has loops 30g and 30h around belt 20. A second set of loops 30i and 30j is provided for attachment to the belt 12 for use with smaller children. In order to prevent the chest engaging vertical portions 30a and 30b from slipping on the belt 20 a restraining strap 40 with attachment means or snaps 41a and 41b is looped around them as shown in FIG. 4.

Figure 5:
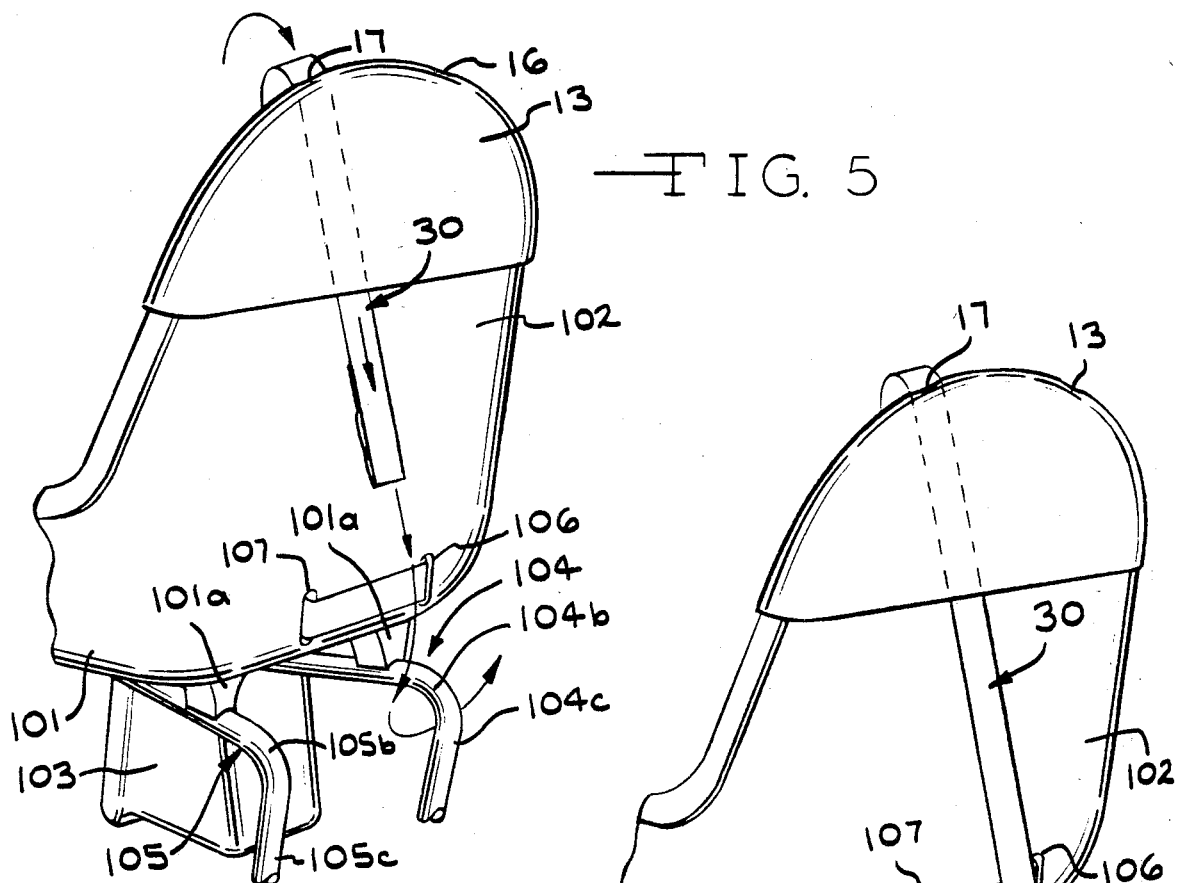
FIGS. 5 and 7 are back isometric views showing the steps in mounting the harness (30) on the frames (104) and (105) of the carrier (100).
Figure 6:
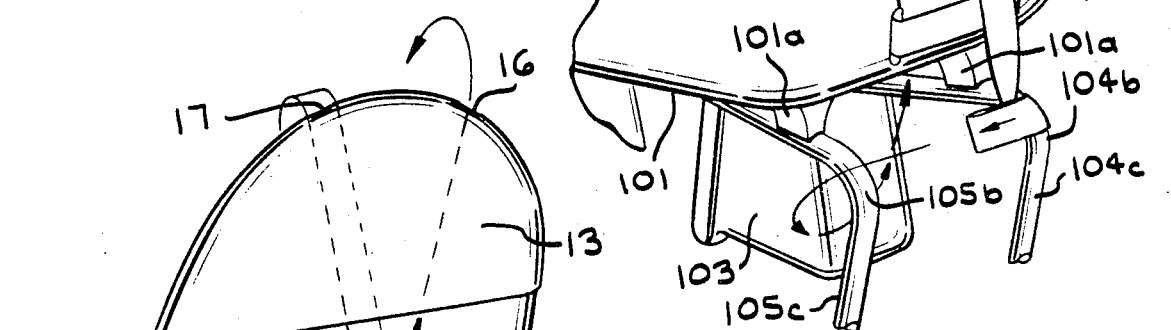
Figure 7:
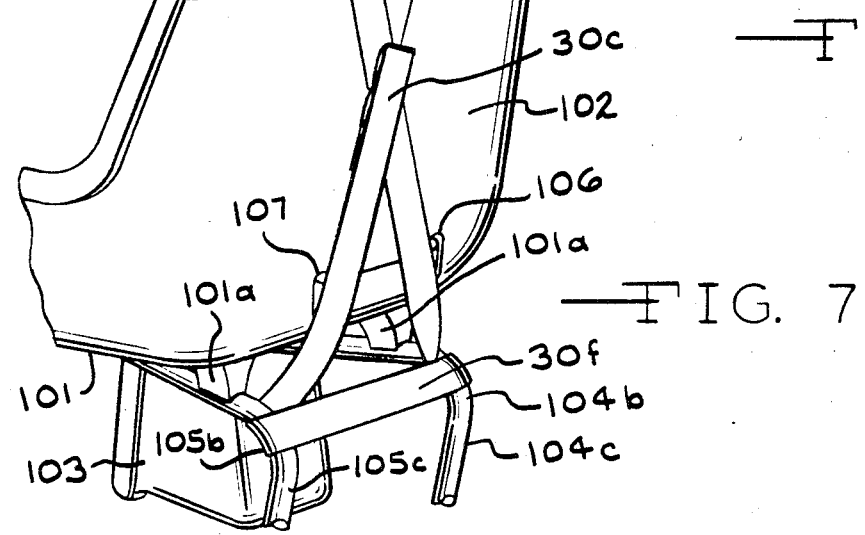

The mounting of the harness 30 is shown in FIGS. 5 to 7. The harness first is directed through slot 17 under cap 13 crosses over, under and around the inside of bend 104b of frame 104 over the top of bend 104b, over the top of bend 105b of frame 105 and under the inside bend 105b crosses over and up under cap 13 through slot 16. Both loops 30g and 30h attach around belt 20 such that indicia 31 on horizontal portion 30f is centered between the frames 104 and 105.

The safety device of the present invention when tightly secured to the child seated in the carrier prevents both forward and sideways movement of the upper body of the child. This prevents sudden inertial movements of the child which can cause the bicycle and rider to tip over particularly in turns. As can be seen, it is the unique combination of the single piece harness 30 with the frames 104 and 105 on the carrier 100, and belt 20 which accomplishes this result. Essentially the crossover 30c of the harness 30 behind the back support portion 102 and the mounting of the harness 30 with loops 30d and 30e on belt 12 prevent any chance of lateral movement since there is always a counteracting force from the harness 30 at the loop 30d or 30e opposite the force on the upper body of the child created at the turn.

It will be appreciated that the harness 30 can be wrapped around the frames 104 and 105 in other ways so long as there is a cross over 30c and a horizontal portion 30f and so that the harness 30 does not slip from side to side because of movement around on the frames 104 and 105. Also it will be appreciated that the carrier 100 can have slots (not shown) at the top for receiving the harness rather than or in addition to the slots 16 and 17 in the cap 13. The positioning of the harness 30 shown in FIGS. 1 to 7 is preferred. The indicia 31 is important to centering the harness 30 when it is mounted on the carrier.

I claim:

1. A safety device for mounting on a bicycle carrier for carrying a seated child, the carrier having a seat member including a seat bottom and a back support portion extending upwardly to a top adjacent to the shoulders of the child, and the carrier having a pair of frames under the seat portion which are essentially horizontal under the carrier and extend behind the seat portion and adjacent to the back support portion with means for attachment of the frames to the bicycle to support the seat member and including a waist belt which extends through two slots in the back support portion of the seat member with a buckle on the belt for securing the belt across the lap of the child, the belt having a length sufficient to encircle the waist of a child which device comprises:

a shoulder harness as a single piece and having two opposite ends secured to the belt, one end of which is attached to the belt, wherein the harness extends from the one end upwardly vertically across the shoulder of the child, over the top of the back support portion, crosses diagonally the back support portion and then around one frame and around the other frame crosses the back support again and then extends vertically across the chest of the child to attach to the belt at the other end of the harness such that there are two vertical portions of the harness across the chest of the child, wherein the safety device restrains movement of upper body of the child when the bicycle turns a corner or stops.

2. The safety device of claim 1 having a restraining strap with an attachment means connecting the two vertical portions of the shoulder harness across the chest of the child.

3. The device of claim 1 wherein the shoulder harness is attached to the belt by means of loops in the shoulder harness at each end around the belt.

4. The device of claim 3 wherein there are at least two sets of loops at each end of the shoulder harness for attachment to the belt.

5. The device of claim 1 which includes a pad which mounts on the seat bottom and the back support portion of the carrier for cushioning the child.

6. A safety device for mounting on a bicycle carrier for carrying a seated child, the carrier having a one piece seat member including a seat bottom and a general U-shaped back support portion extending upwardly to a top adjacent to the shoulders of the child so as to enclose the lower torso of the seated child, the seat member having lower supports attached to the seat bottom partially enclosing the legs and feet of the seated child and the carrier having a pair of frames under the seat portion which are horizontal under the carrier and extend behind and adjacent to the back support portion the seat portion and having a bend in the frame having an inside towards the bicycle and an outside away from the bicycle and with means for attachment of the frames to the bicycle for support of the seat member and including a waist belt which extends through two first slots in the back support portion with a buckle on the belt for securing the belt across the lap of the child, the belt having a length sufficient to encircle the waist of a child which device comprises:

(a) a seat pad which covers the seat bottom of the carrier;

(b) a back pad attached to and extending from the seat pad which covers the back portion of the carrier;

(c) a cap member comprising a panel attached to the back pad to form a pocket shaped to fit over the top of the back support portion to hold the back and seat pads in place on the carrier;

(d) a shoulder harness as a single piece having two opposite ends secured to the belt one end of which is attached to the belt, wherein the harness extends from the one end upward vertically across the shoulder of the child, passes through one of a pair of third slots at the top of the cap, crosses diagonally around a first of the bends in the one frame, crosses around a second of the bends in the other frame passes through the other of the third slots in the cap, extends vertically over the shoulder of the child to attach to the belt at the other end of the harness such that there are two vertical portions of the harness across the chest of the child; and (e) a restraining strap with attachment means connecting the two vertical portions of the harness across the chest of the child, wherein the safety device restrains movement of the body of the child when the bicycle turns a corner or stops.

7. The device of claim 6 wherein the harness passes first around and under the inside of the bend and then around and over the outside of the bend on one side and over and around the outside of the other bend and then under and around the inside of the other bend.

8. The device of claim 6 which is made of cloth.

9. The device of claim 6 wherein the harness is attached to the belt by means of loops in the harness at each end around the belt.

10. The device of claim 8 wherein there are at least two sets of loops in the harness at each end for attachment to the belt.

11. The device of claim 6 wherein a locating indicia or mark is provided between the ends of the harness which is positioned between the frames of the carrier when the device is mounted on the carrier.

* * * * *